United States Patent
Selling et al.

(10) Patent No.: US 7,771,528 B2
(45) Date of Patent: Aug. 10, 2010

(54) PROCESSING FOR PRODUCING ZEIN ARTICLES WITH LIMITED SOLUBILITY

(75) Inventors: Gordon W. Selling, Dunlap, IL (US); Kristen K. Woods, Peoria, IL (US)

(73) Assignee: The United States of America as represented by the Secretary of Agriculture, Washington, DC (US)

( * ) Notice: Subject to any disclaimer, the term of this patent is extended or adjusted under 35 U.S.C. 154(b) by 536 days.

(21) Appl. No.: 11/893,463

(22) Filed: Aug. 16, 2007

(65) Prior Publication Data

US 2009/0044722 A1 Feb. 19, 2009

(51) Int. Cl.
*C08L 89/00* (2006.01)
*C09D 189/00* (2006.01)

(52) U.S. Cl. .................................. 106/156.3
(58) Field of Classification Search ............... 106/156.3
See application file for complete search history.

(56) References Cited

U.S. PATENT DOCUMENTS

| | | | |
|---|---|---|---|
| 1,841,797 A * | 1/1932 | Sponsel et al. .............. 530/360 |
| 2,238,307 A * | 4/1941 | Brother et al. .............. 530/360 |
| 2,822,280 A * | 2/1958 | Martin ..................... 430/289.1 |
| 3,028,308 A * | 4/1962 | Zambito et al. .......... 514/772.3 |
| 3,301,692 A * | 1/1967 | Karjala et al. ............ 106/124.3 |
| 3,304,179 A * | 2/1967 | Field et al. ................... 430/418 |
| 2007/0148359 A1* | 6/2007 | Hoerle et al. ............ 427/407.1 |

* cited by examiner

*Primary Examiner*—David M Brunsman
(74) *Attorney, Agent, or Firm*—John Fado; Randall E. Deck; Lesley Shaw

(57) ABSTRACT

Zein articles are prepared by a melt process where zein is mixed with glyoxal and an inorganic base solution at temperatures above about 40° C. The melt processing can take as a batch process (e.g., as in a torque rheometer) or in a continuous process (e.g., as in reaction extrusion using a screw extruder). This process provides a zein article that has greatly reduced solubility in most of the standard organic solvents that will dissolve unaltered zein.

18 Claims, No Drawings

PROCESSING FOR PRODUCING ZEIN ARTICLES WITH LIMITED SOLUBILITY

BACKGROUND OF THE INVENTION

1. Field of the Invention

This invention relates to processes for making articles from the zein, a protein derived from corn. This invention specifically relates to a method for producing a zein article that is resistant to solvents that normally dissolve zein in a single step using melt processing.

2. Background of the Invention

Zein is a naturally occurring protein, which can potentially be obtained as a co-product of the bio-ethanol industry. Compared to most proteins, zein is characterized by a relative deficiency of hydrophilic groups. In zein, the high proportion of non-polar side chains accounts for the solubility of zein in organic solvents (such as 80% Ethanol/water) and its classification as a prolamine. Zein has been shown to be readily soluble in solvents such as dimethyl formamide (A. Biswas et. al., ACS Symposium Series, 900, Polymer Biocatalysis and Biomaterials, 141-148) and acetic acid (AcOH) (D. Sessa et. al., J. Applied Polymer Science, 105 (5) 2877-2883; G. Selling et. al., Cereal Chemistry, 84 (3) 265-270 and G. Selling et. al., Macrolmolecular Chemistry and Physics, 208 (9) 1002-1010). In order to reduce the impact solvent has on zein articles, it has been treated with cross-linking reagents such as formaldehyde either before or during the coagulation of the article by using an acid/inorganic salt bath. Additional formaldehyde treatments may be employed. C. B. Croston et al., describe such a process in Industrial and Engineering Chemistry, 37 (12) (1945) 1194-1198. Croston et al. call for zein solutions for spinning containing approximately 13 to 16.5% solids, in the pH range of 11.3 to 12.7. E. T. Cline describes another method for producing zein fibers from basic zein solutions in U.S. Pat. No. 2,475,879. Multiple formaldehyde treatments of a zein obtain from a basic zein solution are described in producing a zein fiber by C. D. Evans and C. B. Croston in Textile Research Journal, 19, (1949) 202-211. However, in each of these cases, the zein has been dissolved in solution before treatment with a cross-linking reagent such as formaldehyde.

Recently W. Uy, U.S. Pat. No. 5,750,064, has described a non-basic zein solution which can be dry spun and after post-treatment with formaldehyde gives a resilient article. The articles from these processes have reduced solubility in most of the standard zein solvents. The solids disclosed were 40-60% and required multiple steps.

W. Uy has described the use of zein and water at high temperatures in an extruder to produce fibers. After extrusion, the fibers are stabilized by passing them through a formaldehyde containing bath to give articles with reduced solubility (U.S. Pat. No. 5,580,499). However, the % solids described in this technique is very low which would limit the productivity of the process. In addition the process described is a multi-step process.

T. McMeekin et. al. describes the production of zein fibers by extruding a mixture of approximately 55-62% zein, with the remainder water, through an extruder having a die with holes of the desired diameter. The resulting fibers were then post-treated with formaldehyde by passing through a bath(s) having suitable reagents. In this process, the maximum zein concentration is 62% and the process requires multiple chemical treatments where the first step is mixing with water followed by multiple 'hardening' steps through treatment with formaldehyde.

SUMMARY OF THE INVENTION

We have now discovered a novel process for producing zein articles in a single step which articles have limited solubility in standard solvents such as AcOH, 60-90% ethanol/water and N,N-dimethylformamide, or organic solvents such as tetrahydrofuran, toluene, and acetone. The zein articles of this invention are produced in a melt process by mixing solid phase zein with an aqueous solution of glyoxal in an amount effective to cross-link the zein, together with a catalyst which may be a solution of a group 1A or 2A base (e.g., $Mg(OH)_2$, $Ca(OH)_2$, NaOH, and KOH). The zein, glyoxal solution, and base catalyst are mixed while heating at a temperature of approximately 40° C. or higher with shear and for a period of time effective to form a homogeneous melt of cross-linked zein. The reaction can be conducted in a batch or continuous modes but is preferably conducted in a continuous mode in an extruder.

In accordance with this discovery, it is an object of this invention to provide a method for producing a novel zein article that is resistant to solvents that normally dissolve unaltered zein.

It is another object of this invention to provide a process for making solvent resistant zein articles in a single step using melt processing.

It is another object of this invention to provide a process for making solvent resistant zein articles using melt processing without the need for dissolving the zein in a solvent before processing or treating the resulting article post-production using various chemical treatments.

Other objects and advantages of the invention will become readily apparent from the ensuing description.

DETAILED DESCRIPTION OF THE INVENTION

In accordance with this invention, zein can be rendered resistant to solvents that would normally dissolve unaltered zein, in a single step using melt processing. Without being limited thereto, the melt processed zein articles of this invention exhibit limited solubility (defined as less than or equal to approximately 10% by weight of the finished article dissolving in the solvent when contacted therewith) in standard solvents such as AcOH, 60-90% ethanol/water, or N,N-dimethylformamide. Other solvents known to dissolve organic polymers, such as tetrahydrofuran, toluene, and acetone, were also found to dissolve minimal amounts of the resulting cross-linked zein article.

As noted above, the zein articles are produced by a melt process wherein the zein is mixed with an aqueous solution of glyoxal and a solution of a group 1A or 2A base catalyst under conditions of heat and shear effective to form a homogeneous melt of cross-linked zein capable of being transported using conventional polymer melt processing equipment. The term melt as used herein, is consistent with its use in polymer chemistry, and broadly refers to the conversion of the solid phase zein to a phase suitable for pumping, metering and other conventional melt polymer processes.

The zein used in this process is preferably substantially pure, containing at least about 85% protein, most preferably above about 90% protein. The amount of zein used throughout is dry-basis zein (typically 5% moisture). In contrast to the above-mentioned, previously described processes for cross-linking zein, the zein is initially in a solid phase; it is not dissolved or suspended in a solvent such as ethanol or other alcohol prior to the reaction. The zein may be obtained from commercial sources or it may be extracted from maize, maize products, or maize by-products using techniques conventional in the art.

Glyoxal is added to the zein in an amount effective to cross-link the zein and form the desired melt. The absolute amount of the glyoxal used is somewhat variable, but should be at least 1.5% by weight of the zein (dry basis). In a preferred embodiment, the glyoxal is added in an amount between about 1.5% and about 6%, by weight of the zein (dry basis) (i.e., between about 15 mg up to about 60 mg glyoxal per gram of zein (dry basis)). Although lower amounts may be used, the resultant zein articles have been found to be susceptible to dissolution by AcOH. Conversely, it is envisioned that higher amounts of glyoxal may also be used, but is not preferred because higher amounts do not bring added solvent resistance. To assist processing, the glyoxal added to the zein in the reaction is typically in an aqueous solution. The concentration of the glyoxal in the solution is not critical and may vary. Without being limited thereto, the glyoxal is preferably added as a 40% glyoxal solution in water. In this embodiment, the amount of the solution added to the zein (dry basis) based on weight will preferably be between 3.7 and 15% (for example, 0.037 grams of a 40% glyoxal solution per 1 gram dry zein (dry basis) or 0.150 grams of 40% glyoxal solution per 1 gram of dry zein (dry basis)). Use of 5.0% by zein (dry basis) weight of the 40% glyoxal solution is particularly preferred.

The catalyst suitable for use in the reaction of the invention may be a solution of a group 1A or 2A base (i.e., hydroxides of any of the group 1A or 2A elements of the Periodic Table). Although hydroxides of any of these elements may be used, $Mg(OH)_2$, $Ca(OH)_2$, and particularly NaOH and KOH, are preferred, with NaOH typically used for convenience. The actual amount of the base will vary with the molecular weight of the selected base. Thus, when using group 1A bases (typically NaOH or KOH), the base is preferably provided in an amount between about 0.009 millimoles of base to about 0.3 millimoles of base per gram of zein (dry basis). Alternatively, when using group 2A bases (typically $Ca(OH)_2$ or $Mg(OH)_2$), the base is preferably provided in an amount between about 0.0045 millimoles of base to about 0.15 millimoles of base per gram of zein (dry basis). It is also envisioned that higher amounts could be used, but may be undesirable due to an increased danger of corrosion. The concentration of this base solution is not critical to the process, and can be increased or decreased to the extent that other process variables are not negatively impacted. Typically the amount of 1 M NaOH solution added to the zein (dry basis) on a weight basis is between 0.9 and 27.8% (for example 0.009 grams of 1 M NaOH per 1 gram of zein (dry basis) or 0.278 grams of 1 M NaOH per 1 gram of zein (dry basis)). The concentration of the NaOH solution can be adjusted and the resulting flows varied as long as the amount of NaOH delivered is within the range detailed above. If higher or lower concentrations are used, then the amount of water used elsewhere may need to be altered so that the overall process is not negatively impacted. Preferably a concentration of 1 M NaOH can be used and added at such a rate that 18.5% NaOH solution relative to zein (dry basis) is utilized.

In addition to the above-mentioned zein, glyoxal, and base catalyst, it is envisioned that a variety of optional additives may be included. Without being limited thereto, suitable additives may include plasticizers, delustrants, antioxidants, lubricants, dyes (soluble or pigments), anti-microbials, anti-tacks and other additives typically used in polymer production. For example, in one preferred alternative embodiment, a plasticizer, such as triethylene glycol, is added in an amount from 0 to about 20%, by weight, of the zein (dry basis).

The reaction should be conducted under conditions of temperature and shear (mixing) for a period of time effective to form a homogeneous melt. Suitable temperatures may vary between about 40° C. and 140° C. The reaction time is somewhat variable, and will vary with the temperature and reactor selected, and may be readily determined by the skilled practitioner. However, without being limited thereto, the reaction melt is preferably allowed to mix for between 2 and 10 minutes.

The melt processing can take place in a batch mode or in a continuous mode. In a batch mode, a heated, mixed tank reactor such as a torque rheometer is suitable for use herein. For example, without being limited thereto, in one embodiment, equipment such as a Haake Fisons, Rheocord 90, using the 600 mixing bowl and roller rotors (Thermo Electron Corporation, Madison, Wis.) can be used. When using this equipment, the desired amount of base solution and 40% glyoxal solution are added to the desired amount of zein (dry basis). The mixture may be crudely mixed, such as with a spatula, and then added into the Haake device. Before addition the Haake device should be pre-heated to the desired temperature and have the rotors turning at the desired rpm. After addition, the mixture is allowed to form a melt and process for the desired period of time, typically between 2 and 10 minutes. After this period of time, the melt is removed from the device and cooled. After cooling the resin is frozen with liquid nitrogen and crushed into a fine powder. The powder may then be used to make compression molded articles. In one trial, the mold produced four test samples, conforming to the ASTM D-638-V Standard, (Standard Test Method for Tensile Properties of Plastics, In 1999 Annual Book of ASTM Standards Plastics (I) section 8 D256-D2343; Vol. 8.01 ed.; Edited by Allen, Robert, Ed.; ASTM: West Conshohocken, Pa., 1999; pp 45-57.), at a time. Powder (1.5 g) was placed into each mold. Molding conditions were selected to provide a tensile test sample that did not have visible remnants of the starting powder. The mold was heated at 127° C. and 28 MPa pressure was applied for 20 min using a Carver Model C Press (Wabash, Ind.). The mold was then removed from the Carver press and allowed to cool at room temperature. The articles can then be removed from the mold and tested for resistance to dissolution in AcOH by placing approximately 0.5 grams of the article in approximately 10 grams of AcOH and letting this stand for 4 hours at RT. If less than 10% dissolves, then it is deemed as being resistant to solubilization.

Although the reaction may be conducted in a batch mode, the melt processing is preferably conducted in a continuous mode. In this embodiment an extruder can be used and is preferred. A variety of extruders are suitable for use herein. However, in a preferred embodiment, a twin screw extruder having multiple injection ports is particularly convenient for conducting the reaction extrusion. What is most preferred is the use of a twin screw extruder to which may be added zein, and then through a one injection port there may be added aqueous glyoxal solution (such as 5.1%, by weight of zein (dry basis), of a 40% glyoxal water solution), through another port there may be added the base catalyst (such as 18.5%, by weight of zein (dry basis), of a 1 M sodium hydroxide water solution), and then through a further port there may be added a plasticizer (such as 5% of triethylene glycol, by weight of zein (dry basis)). This melt may then be processed through the extruder and exit the extruder with or without a die. The resulting extrudate may be ground or chopped to a suitable size for compression molding or injection molding. The articles made from such molding are resistant to dissolution by good solvents such as AcOH. By way of example and without being limited thereto, a Werner and Pfleiderer co-rotating ZSK30 twin screw extruder was used for initial compounding. Zein (dry basis) was added to this extruder at 71.25 gr/min. At the first injection port, 1 M NaOH/water solution was be added at 13.2 gr/min. At the second injection port, triethylene glycol was added at 3.75 gr/min. At the third injection port, 40% glyoxal in water was added at 3.8 gr/min. The extruder was run at 147 rpm. The first zone of the extruder was set to 37.8° C. and the remaining zones were set to 80° C. The specific mechanical energy put into the resin was 250 J/gr. The extrudate was ground using a Thomas Wiley mill to provide an appropriately sized mixture for compression molding (which required fine grinding) or injection molding (which required crude grinding).

For injection molding of the extrudate from twin screw compounding, an ACT75B injection molder (Cincinnati Milacron, Batavia Ohio) can be used with a suitable mold (Master Precision Mold, Greenville, Mich.) producing tensile bars in accordance with ASTM D-638-V Standard. The zones in the extruder can be set to 82, 116, 132 and 138° C. The maximum force used can be 186.16 MPa. The mold can be set to 52° C. The articles can then be removed from the mold and tested for resistance to dissolution in AcOH by placing approximately 0.5 grams of the article in approximately 10 grams of AcOH and letting this stand for 4 hours at RT. If less than 10% dissolves, then it is deemed as being resistant to solubilization.

For compression molding of the extrudate from twin screw compounding, the same process as outlined earlier can be used. The articles can then be removed from the mold and tested for resistance to dissolution in AcOH by placing approximately 0.5 grams of the article in approximately 10 grams of AcOH and letting this stand for 4 hours at RT. If less than 10% dissolves, then it is deemed as being resistant to solubilization.

The following examples are intended only to further illustrate the invention and are not intended to limit the scope of the invention which is defined by the claims.

EXAMPLE 1

To 42.75 gr of zein (dry basis) (F4000 grade, Freeman Industries, Tuckahoe, N.Y.) is added the desired amount of 40% glyoxal in water, water and NaOH of specified concentration. Formulation amounts are detailed in Table 1. The mixture was crudely mixed with a spatula for approximately 1 minute. This mixture was then placed into a Haake Fission Torque Rheometer that had been pre-heated to 80° C. Roller rotors were used and were turning at 50 rpm. The resin was allowed to mix for 10 min. After the desired length of time, the resin was removed from the device, cooled, frozen in liquid nitrogen and ground on a Thomas Wiley mill to give a fine powder. To each of the 4 positions, which would give samples having dimensions in accordance with the ASTM D-638-V Standard, of the mold is added 1.5 grams of the powder. The mold was then placed in a Carver Press where it was subjected to a temperature of 127° C. and 28 MPa pressure for 20 min. The samples were removed from the cooled mold. Approximately 0.5 grams of each sample was then placed in 10 grams of AcOH and allowed to stand for 4 hours at RT. If less than 10% dissolves, then it is deemed as being resistant to solubilization. Detailed in Table 1 are the results of these solubilization tests.

COMPARATIVE EXAMPLE 1

To 42.75 gr of zein (dry basis) (F4000 grade, Freeman Industries, Tuckahoe, N.Y.) is added the desired amount of water and 1 or 1.5 M NaOH. Amounts are detailed in Table 2. This mixture was crudely mixed with a spatula for approximately 1 minute. This mixture was then placed into a Haake Fission Torque Rheometer that had been pre-heated to 80° C. Roller rotors were used and were turning at 50 rpm. The resin was allowed to mix for 10 min. After the desired length of time, the resin was removed from the device, cooled, frozen in liquid nitrogen and ground on a Thomas Wiley mill to give a fine powder. To each of the 4 positions, which would give samples having dimensions in accordance with the ASTM D-638-V Standard, of a mold is added 1.5 grams of the powder. The mold was then placed in a Carver Press where it was subjected to a temperature of 127° C. and 28 MPa pressure for 20 min. The samples were removed from the cooled mold. Approximately 0.5 grams of each sample was then placed in 10 grams of AcOH and allowed to stand for 4 hours at RT. More than 10% dissolves, so it is not deemed resistant to solubilization. Detailed in Table 2 are the results of these solubilization tests.

EXAMPLE 2

To 42.75 gr of zein (dry basis) (F4000 grade, Freeman Industries, Tuckahoe, N.Y.) is added the desired amount of 40% glyoxal in water and 1 M NaOH. Amounts are detailed in Table 3. This mixture was crudely mixed with a spatula for approximately 1 minute. This mixture was then placed into a Haake Fission Torque Rheometer that had been pre-heated to between 40 and 90° C. (see Table 3). Roller rotors were used and were turning at 50 rpm. The resin was allowed to mix for 10 min. After the desired length of time, the resin was removed from the device, cooled, frozen in liquid nitrogen and ground on a Thomas Wiley mill to give a fine powder. To each of the 4 positions, which would give samples having dimensions in accordance with the ASTM D-638-V Standard, of a mold is added 1.5 grams of the powder. The mold was then placed in a Carver Press where it was subjected to a temperature of 127° C. and 28 MPa pressure for 20 min. The samples were removed from the cooled mold. Approximately 0.5 grams of each sample was then placed in 10 grams of AcOH and allowed to stand for 4 hours at RT. If less than 10% dissolves, then it is deemed as being resistant to solubilization. Detailed in Table 3 are the results of these solubilization tests.

COMPARATIVE EXAMPLE 2

To 42.75 gr of zein (dry basis) (F4000 grade, Freeman Industries, Tuckahoe, N.Y.) is added the desired amount of water and 1 M NaOH. Amounts are detailed in Table 4. This mixture was crudely mixed with a spatula for approximately 1 minute. This mixture was then placed into a Haake Fission Torque Rheometer that had been pre-heated to either 70 or 90° C. (see Table 4). Roller rotors were used and were turning at 50 rpm. The resin was allowed to mix for 10 min. After the desired length of time, the resin was removed from the device, cooled, frozen in liquid nitrogen and ground on a Thomas Wiley mill to give a fine powder. To each of the 4 positions, which would give samples having dimensions in accordance with the ASTM D-638-V Standard, of a mold is added 1.5 grams of the powder. The mold was then placed in a Carver Press where it was subjected to a temperature of 127° C. and 28 MPa pressure for 20 min. The samples were removed from the cooled mold. Approximately 0.5 grams of each sample was then placed in 10 grams of AcOH and allowed to stand for 4 hours at RT. More than 10% dissolves, so this sample is deemed not resistant to solubilization. Detailed in Table 4 are the results of these solubilization tests.

EXAMPLE 3

To 42.75 gr of zein (dry basis) (F4000 grade, Freeman Industries, Tuckahoe, N.Y.) is added 5 mL of 40% glyoxal in water and 7.9 mL of either 1 M KOH or 0.5 M $Ca(OH)_2$ (see Table 5). This mixture was crudely mixed with a spatula for approximately 1 minute. This mixture was then placed into a Haake Fission Torque Rheometer that had been pre-heated to 80° C. Roller rotors were used and were turning at 50 rpm. The resin was allowed to mix for 10 min. After the desired length of time, the resin was removed from the device, cooled, frozen in liquid nitrogen and ground on a Thomas Wiley mill to give a fine powder. To each of the 4 positions, which would give samples having dimensions in accordance with the ASTM D-638-V Standard, of a mold is added 1.5 grams of the powder. The mold was then placed in a Carver Press where it was subjected to a temperature of 127° C. and 28 MPa pressure for 20 min. The samples were removed from the cooled mold. Approximately 0.5 grams of each sample was then placed in 10 grams of AcOH and allowed to stand for 4 hours at RT. If less than 10% dissolves, then it is deemed as being resistant to solubilization. Detailed in Table 5 are the results of these solubilization tests.

EXAMPLE 4

To the feed throat of a Werner and Pfleiderer co rotating ZSK30 twin screw extruder was added 71.25 gr/min of zein (dry basis). To this material through the first injection port was added 13.2 gr/min of 1 M NaOH in water. To this material through the second injection port was added 3.75 gr/min of triethylene glycol. To this material through the third injection port was added 3.8 gr/min of 40% glyoxal in water. The extruder can be run at 147 rpm. The first zone of the extruder was heated to 37.8° C. with the remaining zones heated to 80° C. The specific mechanical energy put into the resin was 250 J/gr. The extrudate was collected as it exited the extruder—no die was used. The extrudate was ground using a Thomas Wiley mill to provide an appropriately sized mixture for compression molding or injection molding. For injection molding of the extrudate from the twin screw, an ACT75B injection molder (Cincinnati Milacron, Batavia, Ohio) can be used with a suitable mold (Master Precision Mold, Greenville, Mich.) producing Type I tensile bars in accordance with ASTM D638-99. The zones in the extruder were set to 82, 116, 132 and 138° C. The maximum force used was 186.16 MPa. The mold was set to 52° C. The articles were removed from the mold and tested for resistance to dissolution in AcOH by placing approximately 0.5 grams of the article in approximately 10 grams of ACOH and letting this stand for 4 hours at RT. Less than 10% dissolved, so this sample was deemed resistant to solubilization.

COMPARATIVE EXAMPLE 4

To the feed throat of a Werner and Pfleiderer co rotating ZSK30 twin screw extruder was added 71.25 gr/min of zein (dry basis). To this material through the first injection port was added 13.2 gr/min of 1 M NaOH in water. To this material through the second injection port was added 7.5 gr/min of triethylene glycol. To this material through the third injection port was added 6.4 gr/min of water. The extruder was run at 147 rpm. The first zone of the extruder was heated to 37.8° C. with the remaining zones heated to 80° C. The specific mechanical energy put into the resin was 250 J/gr. The extrudate was collected as it exited the extruder—no die was used. The extrudate was ground using a Thomas Wiley mill to provide an appropriately sized mixture for compression molding. For injection molding of the extrudate from the twin screw, an ACT75B injection molder (Cincinnati Milacron, Batavia, Ohio) can be used with a suitable mold (Master Precision Mold, Greenville, Mich.) producing Type I tensile bars in accordance with ASTM D638-99. The zones in the extruder were set to 93, 116, 132 and 132° C. The maximum force used was 103.42 MPa. The mold was set to 38° C. The articles were removed from the mold and tested for resistance to dissolution in AcOH by placing approximately 0.5 grams of the article in approximately 10 grams of AcOH and letting this stand for 4 hours at RT. More than 10% dissolved, so this sample was not deemed resistant to solubilization.

TABLE 1

| Glyoxal, mL | Concentration NaOH | Grams NaOH solution | $H_2O$, g | Less than 10% Dissolves |
|---|---|---|---|---|
| 0.8 | 1 M | 7.9 | 5.3 | no |
| 1.3 | 1 M | 7.9 | 4.8 | yes |
| 1.7 | 1 M | 7.9 | 4.3 | yes |
| 2.1 | 1 M | 7.9 | 3.8 | yes |
| 2.5 | 1 M | 7.9 | 3.2 | yes |
| 5.0 | 1 M | 7.9 | 0.0 | yes |
| 5.0 | 0.05 M | 7.9 | 0.0 | yes |
| 5.0 | 0.1 M | 7.9 | 0.0 | yes |
| 5.0 | 0.25 M | 7.9 | 0.0 | yes |
| 5.0 | 1 M | 4.0 | 3.9 | yes |
| 5.0 | 1.5 M | 7.9 | 0.0 | yes |

TABLE 2

| Concentration NaOH | Grams NaOH solution | $H_2O$, g | Less than 10% Dissolves |
|---|---|---|---|
| 1 M | 7.9 | 3.8 | no |
| 1 M | 4.0 | 7.7 | no |
| 1.5 M | 7.9 | 0.0 | no |

TABLE 3

| Glyoxal, mL | Concentration NaOH | Grams NaOH solution | Temp | less than 10% dissolves in AcOH |
|---|---|---|---|---|
| 5.0 | 1 M | 7.9 | 40 | yes |
| 5.0 | 1 M | 7.9 | 50 | yes |
| 5.0 | 1 M | 7.9 | 60 | yes |
| 5.0 | 1 M | 7.9 | 70 | yes |
| 5.0 | 1 M | 7.9 | 80 | yes |
| 5.0 | 1 M | 7.9 | 90 | yes |

TABLE 4

| Concentration NaOH | Grams NaOH solution | $H_2O$, g | Temp | less than 10% dissolves in AcOH |
|---|---|---|---|---|
| 1 M | 7.9 | 3.8 | 70 | no |
| 1 M | 7.9 | 3.8 | 90 | no |

TABLE 5

| Base | less than 10% dissolves in AcOH |
|---|---|
| KOH | yes |
| Ca(OH)₂ | yes |

It is understood that the foregoing detailed description is given merely by way of illustration and that modifications and variations may be made therein without departing from the spirit and scope of the invention.

We claim:

1. A process for producing zein articles comprising mixing zein with an aqueous solution of glyoxal in an amount effective to cross-link said zein and a catalyst comprising a solution of a group 1A or 2A base and heating at a temperature of approximately 40° C. or higher with shear and for a period of time effective to form a melt processable zein.

2. A melt processed zein article produced by the process of claim 1.

3. The process of claim 1 wherein said zein comprises is substantially pure and a solid phase.

4. The process of claim 1 wherein said amount of glyoxal comprises between about 1.5% and about 6%, by weight of said zein, dry basis.

5. A melt processed zein article produced by the process of claim 4.

6. The process of claim 1 wherein said catalyst comprises a solution of a group 1A base provided in an amount between about 0.009 millimoles of base to about 0.3 millimoles of base per gram of zein, dry basis.

7. A melt processed zein article produced by the process of claim 6.

8. The process of claim 1 wherein said catalyst comprises a solution of a group 2A base provided in an amount between about 0.0045 millimoles of base to about 0.15 millimoles of base per gram of zein, dry basis.

9. A melt processed zein article produced by the process of claim 8.

10. The process of claim 1 wherein said temperature is between about 40° C. and about 140° C.

11. A melt processed zein article produced by the process of claim 10.

12. The process of claim 1 wherein said mixing and heating are conducted in an extruder in a continuous mode.

13. A melt processed zein article produced by the process of claim 12.

14. The process of claim 1 wherein said mixing and heating is conducted in a batch reactor.

15. A melt processed zein article produced by the process of claim 14.

16. The process of claim 1 wherein said mixing further comprises a plasticizer in an amount up to about 20%, by weight, of said zein, dry basis.

17. A melt processed zein article produced by the process of claim 16.

18. The process of claim 1 wherein said period of time is between about 2 and about 10 minutes.

* * * * *